US012381721B2

(12) United States Patent
Kolybelnikov et al.

(10) Patent No.: US 12,381,721 B2
(45) Date of Patent: Aug. 5, 2025

(54) METHOD AND SYSTEM FOR ENCRYPTED MESSAGING

(71) Applicant: Terra Quantum AG, St. Gallen (CH)

(72) Inventors: Alexander Kolybelnikov, St. Gallen (CH); Gordey Lesovik, St. Gallen (CH)

(73) Assignee: Terra Quantum AG, St. Gallen (CH)

( * ) Notice: Subject to any disclaimer, the term of this patent is extended or adjusted under 35 U.S.C. 154(b) by 288 days.

(21) Appl. No.: 18/156,250

(22) Filed: Jan. 18, 2023

(65) Prior Publication Data
US 2023/0231704 A1    Jul. 20, 2023

(30) Foreign Application Priority Data

Jan. 20, 2022   (EP) .................................... 22152464

(51) Int. Cl.
| H04L 9/08 | (2006.01) |
| H04L 9/06 | (2006.01) |
| H04L 9/14 | (2006.01) |
| H04L 9/30 | (2006.01) |
| H04L 9/32 | (2006.01) |
| H04L 9/40 | (2022.01) |

(52) U.S. Cl.
CPC .......... *H04L 9/0852* (2013.01); *H04L 9/0662* (2013.01); *H04L 9/083* (2013.01); *H04L 9/0861* (2013.01); *H04L 9/0869* (2013.01); *H04L 9/14* (2013.01); *H04L 9/3073* (2013.01); *H04L 9/3226* (2013.01); *H04L 9/3242* (2013.01); *H04L 63/0478* (2013.01); *H04L 63/06* (2013.01); *H04L 9/0822* (2013.01); *H04L 9/0855* (2013.01); *H04L 63/0435* (2013.01)

(58) Field of Classification Search
CPC ......... H04L 9/06; H04L 9/065; H04L 9/0656; H04L 9/0662; H04L 9/08; H04L 9/0816; H04L 9/0819; H04L 9/0822; H04L 9/083; H04L 9/0852; H04L 9/0855; H04L 9/0861; H04L 9/0869; H04L 9/14; H04L 9/30; H04L 9/3066; H04L 9/3073; H04L 9/32; H04L 9/3226; H04L 9/3236; H04L 9/3242; H04L 63/04; H04L 63/0428; H04L 63/0435; H04L 63/0478; H04L 63/06

See application file for complete search history.

(56) References Cited

U.S. PATENT DOCUMENTS

| 11,177,946 B2 * | 11/2021 | Islam ..................... H04L 9/0852 |
| 2017/0244687 A1 | 8/2017 | Moulds et al. |
| 2019/0243611 A1 | 8/2019 | Martin et al. |
| 2019/0268145 A1 * | 8/2019 | Barth ..................... H04L 9/0838 |
| 2022/0350501 A1 * | 11/2022 | Dambal ................. G06F 3/0622 |
| 2023/0027422 A1 * | 1/2023 | Hines, III ............. H04L 9/0852 |

FOREIGN PATENT DOCUMENTS

| CN | 113810187 A | 12/2021 |
| EP | 3306464 A1 | 4/2018 |
| JP | 2000-101565 A | 4/2000 |
| JP | 2002-290397 A | 10/2002 |
| JP | 2008-172728 A | 7/2008 |
| KR | 10-2020-0135157 A | 12/2020 |

OTHER PUBLICATIONS

Canadian Intellectual Property Office, Office Action in Canadian Patent Application No. 3,187,153, 8 pp. (Aug. 27, 2024).
European Patent Office, Extended European Search Report in European Patent Application No. 22152464.8, 11 pp. (Jul. 15, 2022).
Menezes et al., "Chapter 13: Key Management Techniques," Handbook of Applied Cryptography, pp. 543-590 (Oct. 1, 1996).
*J. Information Processing Society*, 32(11), 1498-1503 (Nov. 15, 1991).
Japanese Patent Application No. 2023-004647, Office Action (May 28, 2024).

* cited by examiner

*Primary Examiner* — D'Arcy Winston Straub
(74) *Attorney, Agent, or Firm* — Leydig, Voit & Mayer, Ltd.

(57) ABSTRACT

A method and system for encrypted messaging includes first and second client devices and a quantum key device having a quantum random number generator. The generator provides a first quantum random signal, and the key device provides a symmetric first master key from the first quantum random signal. The master key is transmitted to the first client device and stored. The key device uses the master key to generate an encrypted package by encrypting one of a plurality of keys. The key device generates a second encrypted package. The first pairing key is provided to the first client device by decrypting the first encrypted package using the first master key and providing the first pairing key in the second client device by decrypting the second encrypted package using the second master key to establish an encrypted connection between the first and second client devices.

20 Claims, 2 Drawing Sheets

METHOD AND SYSTEM FOR ENCRYPTED MESSAGING

CROSS-REFERENCE TO RELATED APPLICATIONS

This patent application claims priority to European Patent Application No. EP22152464.8, filed on Jan. 20, 2022, which is incorporated herein in its entirety by reference.

FIELD OF THE DISCLOSURE

The present disclosure relates to a method and system for encrypted messaging.

BACKGROUND OF THE INVENTION

Current methods for secure communication between different data processing devices often make use of asymmetric encryption keys. Such methods may generally not be resistant to attacks using quantum computation resources (quantum hacking). There is a need for methods that allow for secure communication, also in light of possible quantum-based attacks.

BRIEF SUMMARY OF THE INVENTION

In a general aspect, the present disclosure describes a method and a system with improved technologies for messaging between data processing devices in a secure manner.

According to one aspect, a method encrypted messaging in a system comprising a first client device, a second client device, and a quantum key device comprising a quantum random number generator is provided.

The method comprises generating, by the quantum random number generator, a first quantum random signal; generating, by the quantum key device, a symmetric first master key from the first quantum random signal; transmitting the first master key to the first client device and storing the first master key in an encrypted first client container in the first client device; generating, by the quantum key device and using the first master key, a first encrypted package by encrypting a first pairing key of a plurality of pairing keys being symmetric and assigned to the first client device and the second client device; generating, by the quantum key device, a second encrypted package by encrypting the first pairing key using a second master key and transmitting the first encrypted package to the first client device and the second encrypted package to the second client device; providing the first pairing key in the first client device by decrypting the first encrypted package using the first master key and providing the first pairing key in the second client device by decrypting the second encrypted package using the second master key; and establishing a first encrypted connection between the first client device and the second client device using the first pairing key.

According to another aspect, a system for encrypted messaging is provided, comprising a first client device, a second client device, and a quantum key device with a quantum random number generator, and configured to perform: generating, by the quantum random number generator, a first quantum random signal; generating, by the quantum key device, a symmetric first master key from the first quantum random signal; transmitting the first master key to the first client device and storing the first master key in an encrypted first client container in the first client device; generating, by the quantum key device and using the first master key, a first encrypted package by encrypting a first pairing key of a plurality of pairing keys being symmetric and assigned to the first client device and the second client device; generating, by the quantum key device, a second encrypted package by encrypting the first pairing key using a second master key and transmitting the first encrypted package to the first client device and the second encrypted package to the second client device; providing the first pairing key in the first client device by decrypting the first encrypted package using the first master key and providing the first pairing key in the second client device by decrypting the second encrypted package using the second master key; and establishing a first encrypted connection between the first client device and the second client device using the first pairing key.

BRIEF DESCRIPTION OF THE SEVERAL VIEWS OF THE DRAWING(S)

DETAILED DESCRIPTION OF THE INVENTION

Figure 1:
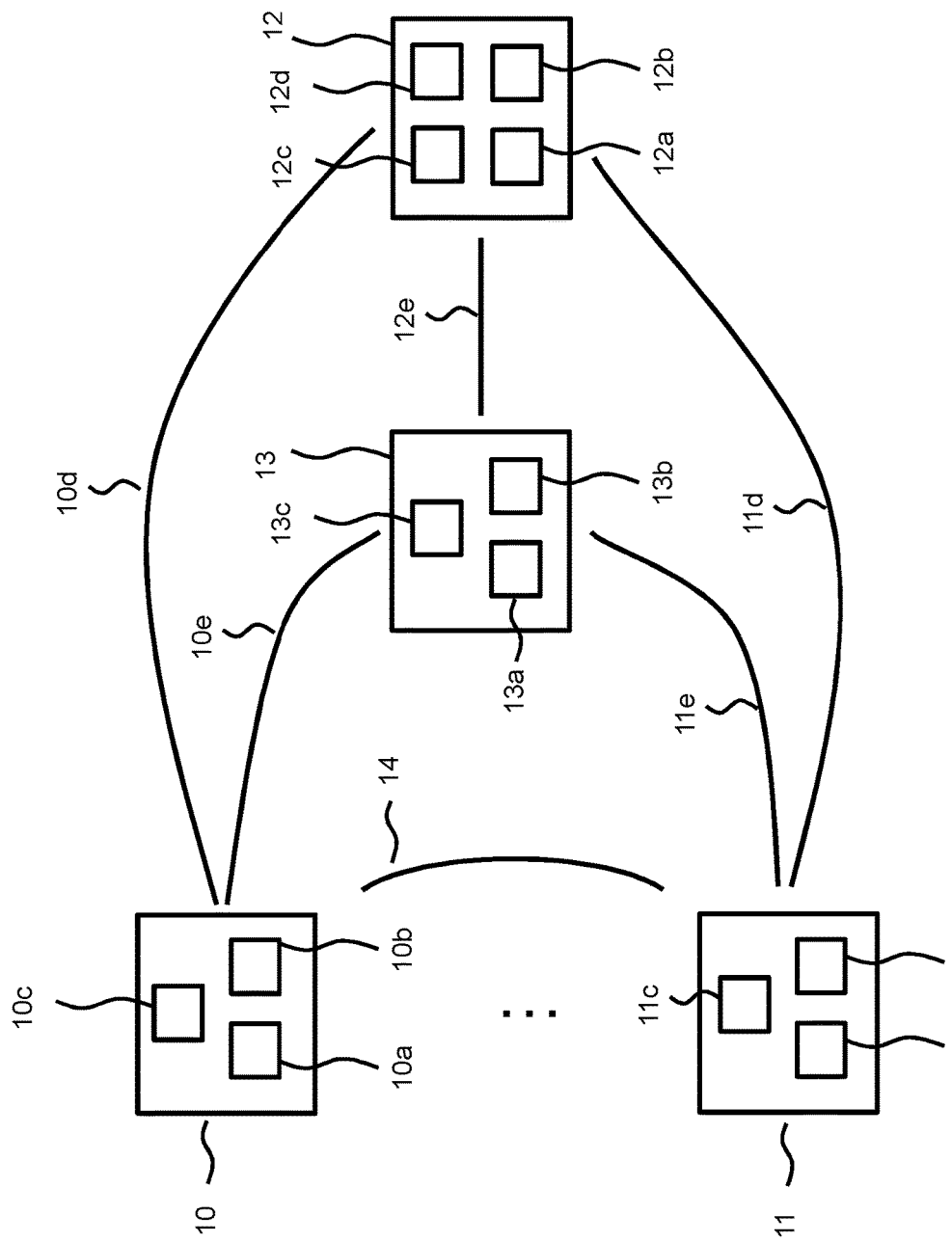
FIG. 1 is a block diagram of a system comprising a plurality of data processing devices in accordance with the disclosure.

FIG. 1 shows a graphical representation of a system comprising a plurality of data processing devices 10, 11, 12, 13, namely a plurality of client devices 10, 11 (comprising a first client device 10 and a second client device 11), a quantum key device 12, and a first server 13. A second server as well as further client devices may be provided, for example a third client device and a fourth client device (not shown).

The first client device 10 comprises a first client device memory 10a, a first client device processor 10b, and a first client device transceiver unit 10c. The second client device 11 comprises a second client device memory 11a, a second client device processor 11b, and a second client device transceiver unit 11c.

The quantum key device 12 comprises a key device memory 12a, a key device processor 12b, a key device communication interface 12c (for example a key device transceiver), and a quantum random number generator 12d. The first server 13 comprises a first server memory 13a, a first server processor 13b, and a first server transceiver unit 13c. The first server 13 may also comprise the quantum key device 12.

The data processing devices 10-13 are configured to exchange signals via respective communication channels 10d, 10e, 11d, 11e, 12e, 14 in particular a first channel 10d between the first client device 10 and the quantum key device 12, a second channel 11d between the second client device 11 and the quantum key device 12, a third channel 10e between the first client device 10 and the first server 13, a fourth channel 11d between the second client device 11 and the first server 13, a fifth channel 12e between the quantum key device 12 and the first server 13, and a sixth channel 14 between the first client device 10 and the second client device 11. The communication channels 10d, 10e, 11d, 11e, 12e, 14 may each comprise wireless channels. Additionally or alternatively, the communication channels 10d, 10e, 11d, 11e, 12e, 14 may comprise a physical connection such as an electrical connection and/or a wired connection, e.g., a cable and/or an optical fiber. Each of the communication channels

10*d*, 10*e*, 11*d*, 11*e*, 12*e*, 14 may for example comprise an internet connection and/or a WiFi connection and/or a Bluetooth connection. The communication channels 10*d*, 10*e*, 11*d*, 11*e*, 12*e*, 14 (in particular the communication channels connected to the quantum key device 12 such as the first channel 10*d*, the second channel 11*d*, and/or the fifth channel 12*e*) may each comprise a local network connection, preferably a local wired connection. Communication between the client devices 10, 11 may take place directly using the sixth channel 14 and/or via the first server 13.

Further, each of the data processing devices 10-13 may comprise a respective input device and/or output device (not shown).

Each of the client devices 10, 11 and the first server 13 may be a single computing device. Alternatively, at least one of the client devices 10, 11 and the first server 13 may be not restricted to a single computing device, but may preferably also comprise a plurality of sub-devices. Each client device 11, 12 may also be or may comprise a user device such as a personal computer, a tablet computer, and/or a mobile phone. Each client device 11, 12 may also represent a further server, in particular with respect to further client devices.

Figure 2:
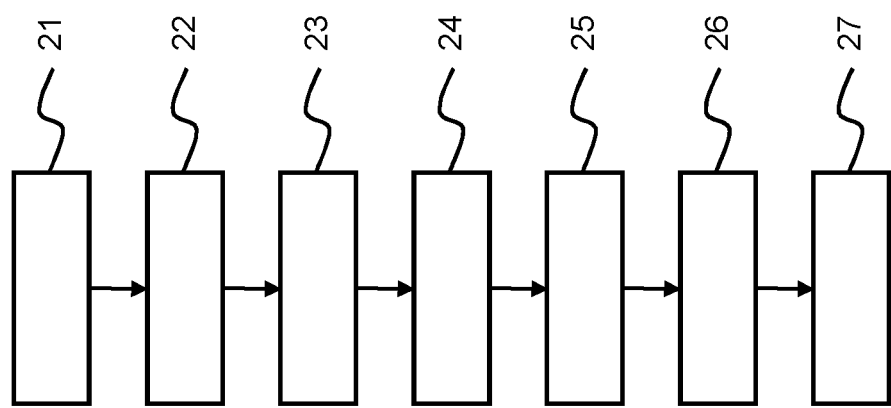
FIG. 2 is a flowchart for a method for encrypted messaging in accordance with the disclosure.

FIG. 2 shows a graphical representation of a method for encrypted messaging.

In a first step 21, the first client device 10 generates a random first client string (first user number) and transmits the first user number to the first server 13 in order to obtain a symmetric first master key.

In a second step 22, the first server 13 checks whether a previous connection with the first client device 10 had been established or not. If the first server determines the connection with the first client device 10 to be a first connection, the first master key is requested from the quantum key device 12. To this end, the first server 13 transmits the first user number to the quantum key device 12.

In response (third step 23), the quantum key device 12 assigns the first master key, generated from a first quantum random signal that had been generated by the quantum random number generator 12*d*, to the first client device 10 (via the first user number). The first master key is then transmitted from the quantum key device 12 to the first client device 10. At this moment, the first client device 10 should be near (i.e., physically close to) the quantum key device 12, for example by receiving the first master key over a local network without presence of a crypto analyst Upon receival, the first master key is stored in an encrypted first client container in the first client device 10. Every time before the first client container is opened/decrypted, a password has to be entered. The first master key is also stored in an encrypted first server container in the first server 13. The first master key is now installed. A second master key for the second client device 11 is installed correspondingly.

In a fourth step 24, addresses are provided in the first client device 10, from which a table of user connections is generated and transmitted to the first server 13 (corresponding to a pairing query message).

In a fifth step 25, the first server 13 determines for the provided user connections from the first client device 10 whether corresponding symmetric pairing keys already exist. For example, if the provided user connections comprise a connection with the second client device 11, the server 13 determines whether a corresponding pairing key is assigned to the first client device 10 and the second client device 11.

When this is the case, the corresponding pairing key (first pairing key) is directly transmitted from the first server 13 to the first client device 10 in a first encrypted package encrypted with the first master key. The first pairing key is also transmitted from the first server 13 to the second client device 11 in a second encrypted package encrypted with the second master key. Otherwise, the first pairing key is requested to be generated in the quantum key device 12 and transmitted to the first server 13 in order to be further transmitted to the first client device 10 and the second client device 11. The first pairing key is or had beforehand been generated by the quantum random number generator 12*d* from a corresponding quantum random signal and stored in an encrypted key device container. Further session keys and chat keys are generated and provided in the client devices analogously.

In a sixth step 26, a first encrypted connection is established between the first client device 10 and the second client device 11 using the first pairing key stored in both client devices 10, 11. Using the first pairing key, the first client device 10 and the second client device 11 can further be authenticated to each other, for example via message authentication codes. After terminating the first encrypted connection, the used first pairing key is removed.

For a subsequent second encrypted connection between the first client device 10 and the second client device 11 (seventh step 27), a symmetric second pairing key has to be generated and provided in both client devices 10, 11. The second pairing key is again transmitted to the first client device 10 via encryption with the first master key and to the second client device 11 via encryption with the second master key.

For security, the first/second master should not be employed for transmitting more than a certain number of pairing keys (e.g., 50 000). After that the first/second master key should be replaced with a subsequent master key.

The features disclosed in this specification, the figures and/or the claims may be material for the realization of various embodiments, taken in isolation or in various combinations thereof.

With the provided method and system, symmetric master keys and symmetric pairing keys for encrypted communication between data processing device may be generated making use of improved randomness properties of quantum random number generators. Quantum random number generators may provide a degree of "true" randomness, which in particular may stand out from the output of classical random number generators, in particular pseudo-random number generators. Such keys may be substantially more resistant to attacks based on randomness imperfections. The method and the system may further allow to efficiently store, distribute, and control such quantum-generated symmetric keys. As a result, encrypted messaging between data processing devices may be provided in an improved manner.

The establishing of the first encrypted connection may comprise generating, in one of the first client device and the second client device, a first encrypted message using the first pairing key and transmitting the first encrypted message to the other one of the first client device and the second client device. It may further be provided that no master key (none of the first master key and the second master key) may be used for establishing the first encrypted connection. It may be provided that the first master key and the master key may only be used for encrypted communication between the first client device and the quantum key device or between the second client device and the quantum key device.

The establishing of the first encrypted connection may comprise authenticating the first client device and/or the second client device using the first pairing key.

The authenticating of the first client device may comprise at least one of generating, in the first client device, a first authentication code from a first authentication message using the first pairing key; transmitting the second message and the first authentication code from the first client device to the second client device; generating, in the second client device, a second authentication code from the second message using the first pairing key; and comparing, in the second client device, the first authentication code with the second authentication code.

Authenticating the first client device may further comprise determining, in the second client device, the first client device as authenticated in case the first authentication code and the second authentication code coincide.

Authenticating the second client device may comprise at least one of generating, in the second client device, a third authentication code from a second authentication message using the first pairing key; transmitting the second authentication message and the third authentication code from the second client device to the first client device; generating, in the first client device, a fourth authentication code from the second authentication message using the first pairing key; and comparing, in the first client device, the third authentication code with the fourth authentication code.

Authenticating the second client device may further comprise determining, in the first client device, the second client device as authenticated in case the third authentication code and the fourth authentication code coincide. Authenticating the first and/or second client device may allow for non-repudiation of authorship of exchanged messages.

At least one of, preferably each one of the first authentication code, the second authentication code, the third authentication code, and the fourth authentication code may be generated using a cryptographic hash function. The cryptographic hash function may for example be one of MD5, SHA-1, SHA-2, SHA-3, and RIPEMD, or any other suitable cryptographic hash function.

Generating the first authentication code and generating the second authentication code may each comprise generating a message hash of the first authentication message and/or generating a pairing key hash of the first pairing key.

At least one of, preferably each one of the first authentication code, the second authentication code, the third authentication code, and the fourth authentication code may also be generated using a block cipher algorithm, for example one of OMAC (one-key message authentication code) and CCM (counter with cipher block chaining message authentication code).

At least one of, and in one embodiment preferably each one of the first authentication code, the second authentication code, the third authentication code, and the fourth authentication code may be generated using a message authentication code algorithm, e.g., Poly1305. Using a symmetric key for generating message authentication codes may result in improved speed in contrast to asymmetric encryption, as e.g. used in PKCS.

The method may further comprise removing the first pairing key from the first client device and/or the second client device, preferably in reaction to terminating the first encrypted connection. The method may comprise removing the first pairing key from the quantum key device, preferably in reaction to the transmitting of the first encrypted package to the first client device and the second encrypted package to the second client device.

The method may comprise at least one of: generating, by the quantum random number generator, a second quantum random signal; generating, by the quantum key device, the second master key from the second quantum random signal; and transmitting the second master key to the second client device and storing the second master key in the second client device, preferably in an encrypted second client container in the second client device.

The method may further comprise decrypting, by the first client device, the encrypted first client container, preferably in reaction to verifying a first client container password. The method may further comprise decrypting, by the second client device, the second client container, preferably in reaction to verifying a second client container password. The first client container password and/or the second client container password may have been supplied to the first client device by a user. The first client container password and/or the second client container password may also be stored on separate memory pages of the first/second client device memory.

The method may comprise storing the first master key in the quantum key device and/or storing the second master key in the quantum key device. The storing of the first master key in the quantum key device may comprise storing the first master key and/or the second master key in an encrypted key device container in the quantum key device.

The method may comprise storing the first pairing key in at least one of the first client device, the second client device, and the quantum key device, in particular in at least one of the first client device container, the second client device container, and the key device container.

The first master key may be stored in the first client device container and/or in the key device container in first master key portions, preferably of fixed bit size. The second master key may be stored in the second client device container and/or in the key device container in second master key portions, preferably of fixed bit size. For example, each master key portion may comprise between 128 and 2048 bits, preferably 256 bits. The first/second master key may, e.g., comprise between four and eight, preferably six first/second master key portions. In principle, the greater the employed key length, the higher the resilience may be against potential quantum computer attacks.

The key device container may be encrypted and/or decrypted using a key device container password. The first client container may be encrypted and/or decrypted using a first client device container password. The second client container may be encrypted and/or decrypted using a second client device container password.

The first/second encrypted package may be generated using only a first/second transfer subset of the first/second master key portions which, e.g., comprises four of the first/second master key portions.

The method may comprise authenticating the quantum key device to the first client device using the first master key and/or to the second client device using the second master key, preferably respectively using a first authentication subset of the first master key portions/a second authentication subset of the second master key portions. The first/second authentication subset may, e.g., comprise two of the first/second master key portions. The first transfer subset and the first authentication subset may be disjoint. The second transfer subset and the second authentication subset may be disjoint. As a result, separate portions of the master keys may be employed for separate method steps such as key transfer and authentication, thus increasing security. Authenticating the quantum key device may comprise using a key device (message) authentication code generated using the first and/or second authentication subset.

At least one of the first client container, the second client container, and the key device container may be encrypted via AES, in particular via AES-AEAD-256. At least one of the first master key, the second master key and the plurality of pairing keys may, e.g., be obtained from the corresponding one of the key device container password, the first client device container password, and the second client device container password via pbkdf2.

The quantum random number generator may be configured to continuously provide quantum random signals, thus continuously providing random numbers (e.g., as a continuous bit string). The quantum random number generator may be controlled to start/stop providing quantum random signals, e.g., by the quantum key device.

The first encrypted package and/or the second encrypted package may be encrypted using at least one block cipher mode of operation. The at least one block cipher mode of operation may be one of electronic codebook (ECB), cipher block chaining (CBC), cipher feedback (CFB), output feedback (OFB), and authenticated encryption with additional data (AEAD).

Using ECB may, e.g., comprise using 256 bits of master key for every 256 bits of session/pairing key. Using CBC may comprise using 256 bits of master key for every $2^{40}$ bits of session/pairing key. Using CFB may comprise using 256 bits master key for every $2^{30}$ bits of session/pairing key. Using OFB may comprise using one master key for every $2^{40}$ bits of session/pairing key. Using AEAD may comprise using 256-bit master key for every $2^{40}$ bits of session/pairing key.

Generating the first encrypted package may comprise encrypting the first pairing key using a hash of the first master key and/or a first key string indicative of the first master key, in particular a first master key file name. Generating the second encrypted package may comprise encrypting the first pairing key using a hash of the second master key and/or a second key string indicative of the second master key, in particular a second master key file name.

The method may further comprise generating, by the first client device, a random or pseudorandom first client string and transmitting the first client string to the quantum key device, and, preferably, generating the first master key in reaction to receiving the first client string in the quantum key device. More preferably, the storing of the first master key in the quantum key device may comprise assigning the first master key to the first client device, in particular to the first client string.

The method may further comprise generating, by the second client device, a random or pseudorandom second client string and transmitting the second client string to the quantum key device and, preferably, generating the first master key in reaction to receiving the first client string in the quantum key device. More preferably, the storing of the second master key in the quantum key device may comprise assigning the second master key to the second client string.

The first client string and/or the second client string may for example comprise a randomly generated integer assigned to one of the first client device and the second client device (user number).

The first master key may be transmitted to the first client device via a secured first channel between the first client device and the quantum key device.

Further, the second master key may be transmitted to the second client device via a secured second channel between the second client device and the quantum key device. Subsequent master keys (in particular those replacing the first master key or the second master key) may also be transmitted to the first client device via the secured first channel or to the second client device via the secured second channel, respectively.

In particular, the first/second master key may be transmitted to the first/second client device via a first/second local network connection between the first/second client device and the quantum key device. Preferably, the first master key may be transmitted to the first client device via a first local wired connection (e.g., comprising a cable and/or an optical fiber) between the first client device and the quantum key device. Further, the second master key may be transmitted to the second client device via a second local wired connection between the first client device and the quantum key device. As a result, security for transmitting the master keys may be increased.

It may be provided that further keys except for the master keys are not transmitted via the first/second local connection, but via non-local network connections such as the internet. For example, the pairing keys may be transmitted from the quantum key device to the client devices via a non-local network connection. Here, security may be provided via encryption of the pairing keys using the master keys. At the same time, efficiency of key distribution may be increased by not employing a local network connection. Communication between the client devices may also take place via a non-local network connection.

The method may further comprise at least one of: generating, by the quantum random number generator, a third quantum random signal; generating, by the quantum key device, the first pairing key and/or a second pairing key of the plurality of pairing keys and/or a plurality of further pairing keys from the third quantum random signal; assigning, by the quantum key device, the first pairing key and/or the second pairing key and/or each of the plurality of further pairing keys to the first client device and the second client device; and storing the first pairing key and/or the second pairing key and/or the plurality of further pairing keys in the quantum key device.

At least one of the first pairing key, the second pairing key and the plurality of further pairing keys may be stored in the (encrypted) key device container.

The method may comprise storing the second pairing key in at least one of the first client device and the second client device, in particular in at least one of the first client device container and the second client device container. Providing multiple master keys and/or pairing keys ready to use may allow for increased encryption speed, in particular with regard to, e.g., PKCS #12 or PKCS #15.

At least one or each one of the plurality of pairing keys and/or further pairing keys may be assigned to a master key. For example, the first pairing key may be assigned to the first master key and/or the second master key.

The assigning of each of the plurality of further pairing keys to the first client device and the second client device may comprise storing pairing key information indicative of the plurality of further pairing keys, the first client device, and the second client device in the quantum key device. The plurality of further pairing keys may thus be part of the plurality of pairing keys assigned to the first client device and the second client device. In other words, the plurality of pairing keys may comprise the plurality of further pairing keys.

The second pairing key and/or the plurality of further pairing keys may be generated and/or assigned to the first client device and the second client device until a maximum of further pairing keys is reached.

The method may further comprise generating, by the quantum key device, a third encrypted package by encrypting the second pairing key and/or the plurality of further pairing keys using the first master key and transmitting the third encrypted package to the first client device. The method may further comprise generating, by the quantum key device, a fourth encrypted package by encrypting the second pairing key and/or the plurality of further pairing keys using the second master key and transmitting the fourth encrypted package to the second client device.

The system may further comprise a first server. Preferably, the transmitting of the first encrypted package to the first client device may comprise transmitting the first encrypted package from the quantum key device to the first server and transmitting the first encrypted package from the first server to the first client device. Additionally or alternatively, the transmitting of the second encrypted package to the second client device may comprise transmitting the second encrypted package from the quantum key device to the first server and transmitting the second encrypted package from the first server to the second client device. Additionally or alternatively, the first master key may be stored in the first server, in particular in an encrypted first server container. The transmitting of the first client string to the quantum key device may comprise transmitting the first client string from the first client device to the first server and transmitting the first client string from the first server to the quantum key device.

As a result, the first server may act as a distribution hub and/or control device between the client devices and the quantum key device.

The first server container may be encrypted using a first server key. The second master key may also be stored in the first server, preferably in the first server container. At least one of the plurality of pairing keys, in particular the first pairing key may be stored in the first server container. The first/second master key may for example be transmitted to the first server via a physical connection (e.g., a third wired connection comprising a cable and/or an optical fiber) between the first server and the quantum key device, in particular in case the quantum key device is part of the first server.

The method may comprise authenticating the first server to the first client device using the first master key and/or to the second client device using the second master key, preferably respectively using the first authentication subset of the first master key portions/the second authentication subset of the second master key portions. Authenticating the first server may comprise using a first server (message) authentication code generated using the first and/or second authentication subset.

The transmitting of the first client string to the quantum key device may comprise transmitting the first client string to the first server and transmitting the first client string from the server to the quantum key device.

Further, transmitting the second client string to the quantum key device may comprise transmitting the second client string to the first server and/or transmitting the second client string from the server to the quantum key device.

The quantum key device may be separate from the first server. Alternatively, the first server may comprise the quantum key device. In this case, transmission between the first server and the quantum key device may comprise transmission between a first server memory and the quantum key device (memory).

Alternatively, the first client string may be directly transmitted from the first client device to the quantum key device.

Further, the second client string may be directly transmitted from the second client device to the quantum key device. The first encrypted package may be directly transmitted from the quantum key device to the first client device. Moreover, the second encrypted package may be directly transmitted from the quantum key device to the second client device.

Server-client pairing keys may be generated and/or provided, and/or employed for encrypted messaging between the first client device and the server or the second client device and the server corresponding to the first pairing key.

The first server may be or may comprise at least one of a security server, a transport server, a transport router, a message archive server, and a key distribution server.

The first server (memory) may comprise a routing table indicative of data processing devices of the system, in particular of the first client device, the second client device, and the quantum key device.

The first master key file name and/or the second master key file name may be provided according to an N-M principle, wherein N may be a first server name and M may be the first client string/second client string and/or a random client number. Such a naming rule may be employed to establish the assignment of the master keys to the respective data processing devices. A pairing key name may be provided in a 2M-K form, wherein M may be one of the first client string and the second client string and K may be the other one of the first client string and the second client string. The factor 2 may represent the pairing key corresponding to pairwise communication.

At least one of the first client container, the second client container, the key device container, and the first server container may comprise a (respective) key table (key data array). For example, the first client container may comprise a first client key table, the second client container may comprise a second client key table, the key device container may comprise a key device key table, and the first server container may comprise a first server container key table.

At least one of the first pairing key, the second pairing key, the plurality of further pairing keys, and the server-client pairing keys may be in stored in the key table, preferably in one of a plurality of key table cells. At least one of the first key string, the second key string, the first client string, and a first server string indicative of the first server may further be stored in the key table, preferably in one of the plurality of key table cells. The first/second master key may for example be stored in the first/second client container outside the first/second client key table.

The key table may comprise a plurality of sub-tables, each of which may preferably be assigned to one of the data processing devices of the system. Each of the sub-tables may for example be at least one of a key table row, a key table column, and a group of key table cells. At least one, preferably each of the sub-tables may be encrypted separately, preferably using a different one of a plurality of sub-table keys. At least one, preferably each of the sub-tables may comprise a distinct sub-table variable. Each sub-table variable may be generated by the quantum random number generator. Each sub-table variable may comprise a length between 64 bits and 2048 bits, preferably 512 bits.

At least one, preferably each of the sub-table keys may be generated using a respective master key and sub-table variable, preferably using a hash of the respective master key and a least significant bit (or most significant bit) of the respective sub-table variable. For example, a first sub-table assigned to the first client device may be generated using the first master key and a first sub-table variable, preferably using a hash of the first master key and a first least significant bit of the first sub-table variable.

The key table may additionally be encrypted by the first master key or the second master key (e.g., using AEAD), preferably in case it has been determined by one of the data processing devices that a user is inactive.

They key table may be configured such that at least one of the first pairing key, the second pairing key, the plurality of further pairing keys, and the server-client pairing keys may be readable and writable asynchronously. The first client container and/or the second client container may be configured such that master keys may be readable and writable asynchronously. Asynchronous reading and writing may correspond to a mismatch between a key generation rate and a key usage rate. Asynchronous reading and writing may correspond to the containers and/or key tables being divided into separately encrypted data ranges. Since the data ranges may each be opened only for reading or writing, switching to a new encryption key (e.g., when an old key usage limit is reached) may allow for switching to the new key transparently and without delay. As a result, simultaneously storing several sets of keys for communication between client devices and servers may be provided.

It may be provided that the first master key and the master key are only used for encrypted communication between the first client device and the first server, between the second client device and the first server, and/or between the quantum key device and the first server.

The method may further comprise at least one of: transmitting a pairing query message indicative of the second client device from the first client device to the first server; in reaction to determining that at least one of the plurality of pairing keys is assigned to the first client device and the second client device and is stored in the first server, transmitting the at least one of the plurality of pairing keys from the first server to the first client device; in reaction to determining that none of the plurality of pairing keys is assigned to the first client device and the second client device and is stored in the first server, transmitting a pairing key server request message from the first server to the quantum key device; and in reaction to receiving the pairing key server request message in the quantum key device, transmitting at least one of the plurality of pairing keys from the quantum key device to the first server and transmitting the at least one of the plurality of pairing keys from the first server to the first client device.

Transmitting a second pairing query message indicative of the first client device from the second client device to the first server and pairing key transmission to the second client device may be provided correspondingly.

The at least one of the plurality of pairing keys may comprise the first pairing key and/or the second pairing key.

Transmitting the at least one of the plurality of pairing keys from the quantum key device to the first server and/or from the first server to the first client device may comprise transmitting the at least one of the plurality of pairing keys in an encrypted package.

The method may further comprise removing the at least one of the plurality of pairing keys from the first server in reaction to transmitting the at least one of the plurality of pairing keys from the first server to the first client device.

The method may also comprise generating, by the quantum random number generator, the third quantum random signal in reaction to receiving the pairing key request message in the quantum key device.

At least one of or each of the plurality of pairing keys may be a session key and/or a chat key.

The pairing query message may be transmitted from the first client device to the first server in reaction to providing contact information in the first client device, the contact information preferably being indicative of the second client device.

The method may comprise: in reaction to determining that less than a first pairing key threshold of the plurality of pairing keys is stored in the first client device, transmitting a first pairing key request message from the first client device to the quantum key device; and/or in reaction to determining that less than a second pairing key threshold of the plurality of pairing keys is stored in the second client device, transmitting a second pairing key request message from the second client device to the quantum key device.

In reaction to receiving the first and/second pairing key request message in the quantum key device, at least one further pairing key may be transmitted from the quantum key device to the first and/or second client device in a further encrypted package. The first and/or second pairing key threshold may for example be between 2 and 10, preferably 5.

The method may comprise at least one of: providing a second pairing key of the plurality of pairing keys in the first client device by decrypting, using the first master key, the first encrypted package or a third encrypted package transmitted from the quantum key device to the first client device; providing the second pairing key in the second client device by decrypting, using the second master key, the second encrypted package or a fourth encrypted package transmitted from the quantum key device to the second client device; establishing a second encrypted connection between the first client device and the second client device using the second pairing key; and providing, in the first client device and/or the quantum key device, first pairing data indicative of a first number of used pairing keys and of the first master key; and providing, in the second client device and/or the quantum key device, second pairing data indicative of a second number of used pairing keys and of the second master key.

The first number of used pairing keys may be indicative of used pairing keys decrypted with the first master key. The second number of used pairing keys may be indicative of used pairing keys decrypted with the second master key. As a result, the number of pairing keys per master key may be tracked.

The providing of the first and/or second pairing data may respectively comprise generating the first and/or second number of used pairing keys or modifying the first and/or second number of used pairing keys, in particular incrementing the first and/or second number of used pairing keys, preferably by one. The first and/or second number of used pairing keys may be an integer value. The first and/or second number of used pairing keys may have an initial value of zero.

Additionally or alternatively, the pairing data may be provided in the first server. The second pairing key may be assigned to the first master key and/or the second master key.

The method may further comprise at least one of: encrypting, in the first client device and/or the second client device, the first pairing key using a first encryption key and encrypting the second pairing key using a second encryption key different from the first encryption key; and storing the first pairing key and the second pairing key being encrypted in the first client device and/or the second client device.

In particular, at least two of the first master key, the second master key, the first pairing key, the second pairing key, each of the further pairing keys, and each of the server client pairing keys may be encrypted using pairwise different encryption keys and, preferably, may be stored being encrypted in at least one of the first client device, the second client device, the first server, and the quantum key device. For example, the first pairing key, the second pairing key, and each of the further pairing keys may be encrypted using pairwise different encryption keys and stored being encrypted in the first client device.

The first pairing key and the second pairing key may be stored in the key table. The first encryption key may be generated using the first master key and the first sub-table variable, preferably using the hash of the first master key and the first least significant bit of the first sub-table variable. The second encryption key may be generated using the first master key and the second sub-table variable, preferably using the hash of the first master key and the second least significant bit of the second sub-table variable. In particular, the different encryption keys may be the sub-table keys.

The method may further comprise at least one of: generating, by the quantum random number generator, a fourth quantum random signal; generating, by the quantum key device, a symmetric third master key from the fourth quantum random signal and storing the third master key in the quantum key device; transmitting the third master key to the first client device and storing the third master key in the first client device; and removing the first master key from the quantum key device and/or the first client device.

The method may further comprise at least one of: generating, by the quantum random number generator, a fifth quantum random signal; generating, by the quantum key device, a symmetric fourth master key from the fifth quantum random signal and storing the fourth master key in the quantum key device; transmitting the fourth master key to the second client device and storing the fourth master key in the second client device; and removing the second master key from the quantum key device and/or the second client device.

The third master key may be transmitted to the first client device in reaction to determining, by the quantum key device and/or the first client device, that the first number of used pairing keys exceeds a first threshold value. The fourth master key may be transmitted to the second client device in reaction to determining, by the quantum key device and/or the second client device, that the second number of used pairing keys exceeds a second threshold value.

The first master key may be removed from the quantum key device and/or the first client device in reaction to determining, by the quantum key device and/or the first client device, that the first number of used pairing keys exceeds the first threshold value. Further, the second master key may be removed from the quantum key device and/or the second client device in reaction to determining, by the quantum key device and/or the second client device, that the second number of used pairing keys exceeds the second threshold value.

Removing of a key may comprise bitwise zeroing at the respective memory position and double overwriting of a random sequence.

The first threshold value and the second threshold value may be the same. The first threshold value and/or the second threshold value may be between 1 000 and 100 000, preferably between 10 000 and 60 000, more preferably 50 000. As a result, a new master key may be employed, e.g., every 50 000 encrypted connections/pairing keys.

The third master key and/or the fourth master key may be tested by transmitting a test message from the first/second client device to the first server and/or the quantum key device. The test message may, e.g., have a length of 128 bits. The test message may comprise a bit string, e.g., 1010 0101 1111 0000 1100 0011 1010 0101 1111 0000 1010 0101 1111 0000 1010 0101 1111 0000 1010 0101 1111 0000 1100 0011 1010 0101 1111 0000 1010 0101 1111 0000. In principle, any string known to both first and second client device may be employed. The test message may be encrypted using the third/fourth master key.

The method may comprise providing, in the first client device and/or the quantum key device, third pairing data indicative of a third number of used pairing keys and of the third master key and providing, in the second client device and/or the quantum key device, fourth pairing data indicative of a fourth number of used pairing keys and of the fourth master key.

At least one of, preferably, each of the first master key, the second master key, the third master key, the fourth master key, the first pairing key, the second pairing key, the further pairing keys, the server client pairing keys may be stored (e.g., in random access memory) using a respective mask. Each mask may be a randomly generated number (e.g., a bit sequence), preferably stored in a separate memory page (in an encrypted container). Each mask may, e.g., be randomly generated by the quantum key device. Storing at least one or each of the keys using the respective mask may comprise applying an XOR operation on (binary representations of) the key and the mask and storing the resulting (bit) string. Accessing/providing the key (e.g., for subsequently using the key for encryption) may comprise applying the XOR operation on the resulting string and the mask, which in turn yields the key.

The method may comprise revoking at least one of the first master key, the second master key, the third master key, the fourth master key, the first pairing key, the second pairing key, the further pairing keys, the server client pairing keys, for example in reaction to determining a key being compromised. Revoking a key may comprise removing and/or replacing the key from all data processing devices of the system.

The first client device, the second client device, the first server, and the quantum key device may be connected with each other by cable and/or wirelessly.

The embodiments described above in connection with the method for encrypted messaging may be provided correspondingly for the system for encrypted messaging. Embodiments as described herein regarding a first entity such as a first client device or a first pairing key may be provided for a corresponding second entity and/or third entity and/or fourth entity. As understood herein, storing in a data processing device may comprise storing in a memory of the data processing device.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for encrypted messaging in a system comprising a first client device, a second client device, and a quantum key device comprising a quantum random number generator, the method comprising:
    generating, by the quantum random number generator, a first quantum random signal;
    generating, by the quantum key device, a symmetric first master key from the first quantum random signal;
    transmitting the first master key to the first client device, and storing the first master key in an encrypted first client container in the first client device;
    generating, by the quantum key device and using the first master key, a first encrypted package by encrypting a first pairing key of a plurality of pairing keys being symmetric and assigned to the first client device and the second client device;
    generating, by the quantum key device, a second encrypted package by encrypting the first pairing key using a second master key and transmitting the first encrypted package to the first client device and the second encrypted package to the second client device;
    providing the first pairing key in the first client device by decrypting the first encrypted package using the first master key and providing the first pairing key in the second client device by decrypting the second encrypted package using the second master key; and
    establishing a first encrypted connection between the first client device and the second client device using the first pairing key.

2. The method according to claim 1, wherein the establishing of the first encrypted connection comprises generating, in one of the first client device or the second client device, a first encrypted message using the first pairing key and transmitting the first encrypted message to the other one of the first client device or the second client device.

3. The method according to claim 1, wherein the establishing of the first encrypted connection comprises authenticating the first client device and/or the second client device using the first pairing key.

4. The method according to claim 3, wherein the authenticating of the first client device comprises:
    generating, in the first client device, a first authentication code from a first authentication message using the first pairing key;
    transmitting a second message and the first authentication code from the first client device to the second client device;
    generating, in the second client device, a second authentication code from the first authentication message using the first pairing key; and
    comparing, in the second client device, the first authentication code with the second authentication code.

5. The method according to claim 1, further comprising:
    generating, by the quantum random number generator, a second quantum random signal;
    generating, by the quantum key device, the second master key from the second quantum random signal; and
    transmitting the second master key to the second client device; and
    storing the second master key in an encrypted second client container in the second client device.

6. The method according to claim 1, further comprising:
    generating, by the first client device, a random or pseudorandom first client string;
    transmitting the random or pseudorandom first client string to the quantum key device; and
    generating the first master key in reaction to receiving the random or pseudorandom first client string in the quantum key device;
    wherein storing the first master key in the quantum key device comprises assigning the first master key to the first client device.

7. The method according to claim 1, wherein the first master key is transmitted to the first client device via a secured first channel between the first client device and the quantum key device.

8. The method according to claim 1, further comprising:
    generating, by the quantum random number generator, a third quantum random signal;
    generating, by the quantum key device, the first pairing key and/or a plurality of further pairing keys from the third quantum random signal;
    assigning, by the quantum key device, the first pairing key and/or each of the plurality of further pairing keys to the first client device and the second client device; and
    storing the first pairing key and/or the plurality of further pairing keys in the quantum key device.

9. The method according claim 8, wherein the plurality of further pairing keys is generated and/or assigned to the first client device and the second client device until a maximum of further pairing keys is reached.

10. The method according to claim 1, further comprising providing a first server, wherein:
    the transmitting of the first encrypted package to the first client device comprises transmitting the first encrypted package from the quantum key device to the first server and transmitting the first encrypted package from the first server to the first client device;
    the transmitting of the second encrypted package to the second client device comprises transmitting the second encrypted package from the quantum key device to the first server and transmitting the second encrypted package from the first server to the second client device; and
the first master key is stored in the first server.

11. The method according to claim 10, further comprising:
transmitting a pairing query message indicative of the second client device from the first client device to the first server;
in reaction to determining that at least one of the plurality of pairing keys is assigned to the first client device and the second client device and is stored in the first server, transmitting the at least one of the plurality of pairing keys from the first server to the first client device;
in reaction to determining that none of the plurality of pairing keys is assigned to the first client device and the second client device and is stored in the first server;
transmitting a pairing key server request message from the first server to the quantum key device; and
in reaction to receiving the pairing key server request message in the quantum key device, transmitting at least one of the plurality of pairing keys from the quantum key device to the first server, and transmitting the at least one of the plurality of pairing keys from the first server to the first client device.

12. The method according to claim 1, further comprising:
providing a second pairing key of the plurality of pairing keys in the first client device by decrypting, using the first master key, the first encrypted package or a third encrypted package transmitted from the quantum key device to the first client device;
providing the second pairing key in the second client device by decrypting, using the second master key, the second encrypted package or a fourth encrypted package transmitted from the quantum key device to the second client device;
establishing a second encrypted connection between the first client device and the second client device using the second pairing key;
providing, in the first client device and/or the quantum key device, first pairing data indicative of a first number of used pairing keys and of the first master key; and
providing, in the second client device and/or the quantum key device, second pairing data indicative of a second number of used pairing keys and of the second master key.

13. The method according to claim 12, further comprising:
encrypting, in the first client device and/or the second client device, the first pairing key using a first encryption key and encrypting the second pairing key using a second encryption key different from the first encryption key; and
storing the first pairing key and the second pairing key being encrypted in the first client device and/or the second client device.

14. The method according to claim 1, further comprising:
generating, by the quantum random number generator, a fourth quantum random signal;
generating, by the quantum key device, a symmetric third master key from the fourth quantum random signal and storing the third master key in the quantum key device;
transmitting the third master key to the first client device and storing the third master key in the first client device; and
removing the first master key from the first client device and/or quantum key device.

15. A system for encrypted messaging, comprising:
a computing platform;
a first client device;
a second client device; and
a quantum key device with a quantum random number generator;
wherein the computing platform is configured to:
generate, by the quantum random number generator, a first quantum random signal;
generate, by the quantum key device, a symmetric first master key from the first quantum random signal;
transmit the first master key to the first client device and store the first master key in an encrypted first client container in the first client device;
generate, by the quantum key device and using the first master key, a first encrypted package by encrypting a first pairing key of a plurality of pairing keys being symmetric and assigned to the first client device and the second client device;
generate, by the quantum key device, a second encrypted package by encrypting the first pairing key using a second master key and transmitting the first encrypted package to the first client device and the second encrypted package to the second client device;
provide the first pairing key in the first client device by decrypting the first encrypted package using the first master key and providing the first pairing key in the second client device by decrypting the second encrypted package using the second master key; and
establish a first encrypted connection between the first client device and the second client device using the first pairing key.

16. The system according to claim 15, wherein the establishing of the first encrypted connection comprises generating, in one of the first client device or the second client device, a first encrypted message using the first pairing key and transmitting the first encrypted message to the other one of the first client device or the second client device.

17. The system according to claim 15, wherein the establishing of the first encrypted connection comprises authenticating the first client device and/or the second client device using the first pairing key.

18. The system according to claim 17, wherein the authenticating of the first client device comprises:
generating, in the first client device, a first authentication code from a first authentication message using the first pairing key;
transmitting the second message and the first authentication code from the first client device to the second client device;
generating, in the second client device, a second authentication code from the first authentication message using the first pairing key; and
comparing, in the second client device, the first authentication code with the second authentication code.

19. The system according to claim 15, wherein the computing platform is further configured to:
generate, by the quantum random number generator, a second quantum random signal;
generate, by the quantum key device, the second master key from the second quantum random signal; and
transmit the second master key to the second client device; and
store the second master key in an encrypted second client container in the second client device.

20. The system according to claim 15, wherein the computing platform is further configured to:

generate, by the first client device, a random or pseudorandom first client string;

transmit the random or pseudorandom first client string to the quantum key device; and generate the first master key in reaction to receiving the random or pseudorandom first client string in the quantum key device;

wherein the storing of the first master key in the quantum key device comprises assigning the first master key to the first client device.

* * * * *